(12) United States Patent
Yang et al.

(10) Patent No.: US 9,638,950 B2
(45) Date of Patent: May 2, 2017

(54) DISPLAY WITH OPAQUE BORDER RESISTANT TO ELECTROSTATIC DISCHARGE

(71) Applicant: Apple Inc., Cupertino, CA (US)

(72) Inventors: Young Cheol Yang, Sunnyvale, CA (US); Xinyu Zhu, Cupertino, CA (US); Jin Yan, Santa Clara, CA (US); Cheng Chen, San Jose, CA (US); Po-Wen Chiu, Cupertino, CA (US); Jun Qi, Cupertino, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 278 days.

(21) Appl. No.: 14/278,768

(22) Filed: May 15, 2014

(65) Prior Publication Data

US 2015/0331292 A1    Nov. 19, 2015

(51) Int. Cl.
*G02F 1/1333* (2006.01)
*G02F 1/1335* (2006.01)
*G02F 1/1362* (2006.01)
*G02F 1/1368* (2006.01)

(52) U.S. Cl.
CPC ...... *G02F 1/133512* (2013.01); *G02F 1/1368* (2013.01); *G02F 1/133514* (2013.01); *G02F 1/136204* (2013.01); *G02F 2001/133357* (2013.01); *G02F 2001/133388* (2013.01); *G02F 2202/22* (2013.01)

(58) Field of Classification Search
CPC ......... G02F 1/133512; G02F 1/136204; G02F 2001/133388; G02F 2202/22

USPC .................................................. 349/40, 110
See application file for complete search history.

(56) References Cited

U.S. PATENT DOCUMENTS

| | | | |
|---|---|---|---|
| 5,572,343 A | 11/1996 | Okamura et al. | |
| 5,739,800 A | 4/1998 | Lebby et al. | |
| 8,460,953 B2 * | 6/2013 | Tanaka | G02F 1/133512 257/E33.067 |
| 8,467,177 B2 | 6/2013 | Mathew et al. | |
| 8,581,862 B2 * | 11/2013 | Oohira | G02F 1/13338 345/173 |
| 2001/0000676 A1 | 5/2001 | Zhang et al. | |
| 2001/0019130 A1 | 9/2001 | Yamazaki et al. | |

(Continued)

FOREIGN PATENT DOCUMENTS

JP      2000330090 A2    11/2000

*Primary Examiner* — Paisley L Arendt
(74) *Attorney, Agent, or Firm* — Treyz Law Group, P.C.; G. Victor Treyz; Zachary D. Hadd

(57) ABSTRACT

A display may have a color filter layer and a thin-film transistor layer. A liquid crystal layer may be located between the color filter layer and the thin-film transistor layer. The display may have an active area surrounded by an inactive area. The opaque border layer may contain first and second opaque layers in the inactive area. The first opaque layer may have an opening in the inactive area that is overlapped by an isolation layer. The second opaque layer may be located in the inactive area and may overlap the opening in the first opaque layer to block light in the inactive area. The isolation layer may be interposed between the first and second opaque layers and may prevent static charge from an electrostatic discharge event along the edge of the display from migrating to the active area through the opaque border in the inactive area.

17 Claims, 17 Drawing Sheets

(56) References Cited

U.S. PATENT DOCUMENTS

| | | |
|---|---|---|
| 2002/0063253 A1 | 5/2002 | Hong et al. |
| 2003/0161093 A1 | 8/2003 | Lam et al. |
| 2006/0227232 A1 | 10/2006 | Zhang et al. |
| 2008/0057604 A1 | 3/2008 | Tanaka |
| 2012/0105400 A1 | 5/2012 | Mathew et al. |
| 2012/0229736 A1* | 9/2012 | Osaki ............... G02F 1/133512 349/96 |
| 2014/0028961 A1* | 1/2014 | Yanagisawa ...... G02F 1/133512 349/106 |

* cited by examiner

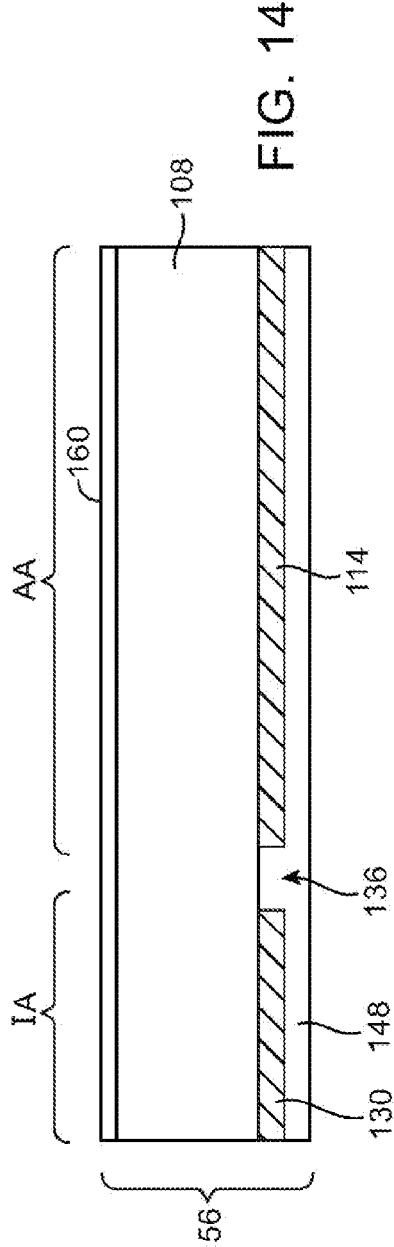
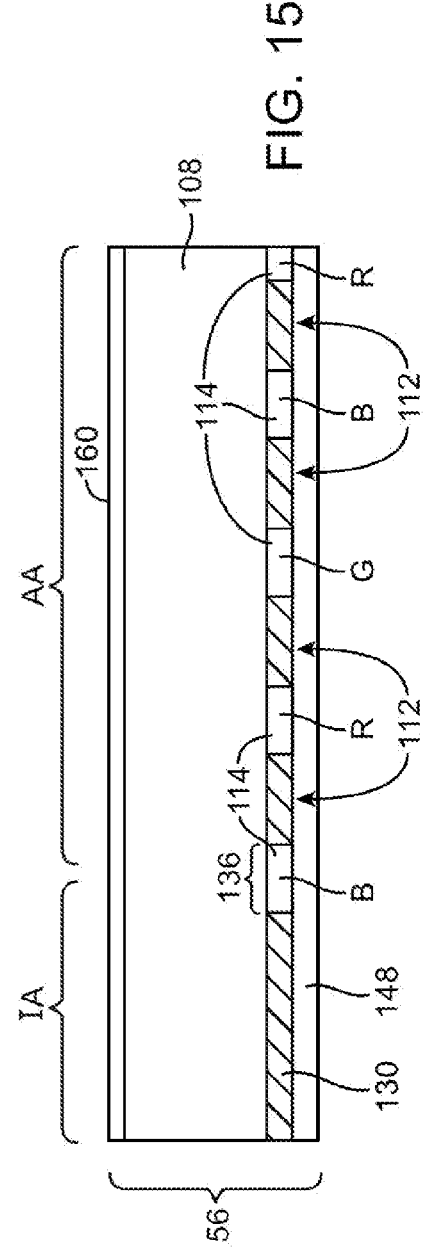

DISPLAY WITH OPAQUE BORDER RESISTANT TO ELECTROSTATIC DISCHARGE

BACKGROUND

This relates generally to electronic devices, and more particularly, to electronic devices with displays.

Electronic devices often include displays. For example, cellular telephones and portable computers may have displays for presenting information to a user.

Liquid crystal displays contain a layer of liquid crystal material. Display pixels in a liquid crystal display contain thin-film transistors and electrodes for applying electric fields to the liquid crystal material. The strength of the electric field in a display pixel controls the polarization state of the liquid crystal material and thereby adjusts the brightness of the display pixel.

Substrate layers such as color filter layers and thin-film transistor layers are used in liquid crystal displays. A thin-film transistor layer contains an array of the thin-film transistors that are used in controlling electric fields in the liquid crystal layer. A color filter layer contains an array of color filter elements such as red, blue, and green elements. The color filter layer provides the display with the ability to display color images.

In an assembled display, the layer of liquid crystal material is sandwiched between the thin-film transistor layer and the color filter layer. The center of the display forms an active area that is occupied by an array of pixels. The border of the display is inactive and may contain support circuitry. In the inactive border, opaque masking material is used to prevent stray light from escaping from the display and to hide support circuitry from view by a user of the display.

The opaque masking material is formed from an opaque material such black ink. The black ink is formed from a photoimageable polymer that contains a black filler material. The black ink is an insulator, but is generally not able to withstand high voltages. During electrostatic discharge events in which a user touches the edge of the display, high voltages such as voltages on the order of 10 kV or higher may be applied to the black ink. The black ink cannot reliably withstand these high voltages, so static charge may migrate into the active area of the display through the black ink. This disrupts the electric field distribution within the liquid crystal material of the display and leads to visible artifacts. As an example, the pixels of the display near the border may exhibit a visible color cast, because pixels of different colors respond differently to the disruption from the static charge.

In an effort to enhance immunity to electrostatic discharge, some displays have opaque masking layers that are recessed from the outermost edge of the display. This creates a high resistance air gap that can resists electrostatic discharge, but involves the addition of an overlapping opaque gasket structure on the outside of the layers in the display to prevent light leakage. The overlapping opaque gasket structure may undesirably increase the bulk of the display structures at the edge of the display.

It would therefore be desirable to be able to provide improved electronic device displays with structures that prevent display damage from electrostatic discharge.

SUMMARY

A display may have a color filter layer and a thin-film transistor layer. A layer of liquid crystal material may be located between the color filter layer and the thin-film transistor layer. The display may have an active area surrounded by an inactive area.

The thin-film transistor layer may have an array of pixel electrodes and pixel circuits in the active area. The color filter layer may have a black matrix in the active area. The black matrix may have openings that receive color filter elements.

An opaque border layer may be formed in the inactive area. The opaque border layer may contain first and second opaque layers. The first opaque layer may have portions in the inactive area that form the black matrix. In the inactive area, the first opaque layer may have an opening that is overlapped at least partly by an isolation layer. The second opaque layer may be located in the inactive area and may overlap the opening in the first opaque layer to block light in the inactive area. The isolation layer may be interposed between the first and second opaque layers and may prevent static charge from an electrostatic discharge event along the edge of the display from migrating to the active area through the opaque border in the inactive area. The isolation layer may be formed form an inorganic material such as silicon nitride or other transparent inorganic layer or may be formed from a polymer such as clear polymer that is also used to form a planarizing overcoat layer in the active area.

BRIEF DESCRIPTION OF THE DRAWINGS

FIGS. 14 and 15 are cross-sectional side views of portions of the color filter layer of FIG. 13 in accordance with an embodiment.

DETAILED DESCRIPTION

Electronic devices may include displays. The displays may be used to display images to a user. Illustrative electronic devices that may be provided with displays are shown in FIGS. 1, 2, 3, and 4.

Figure 1:
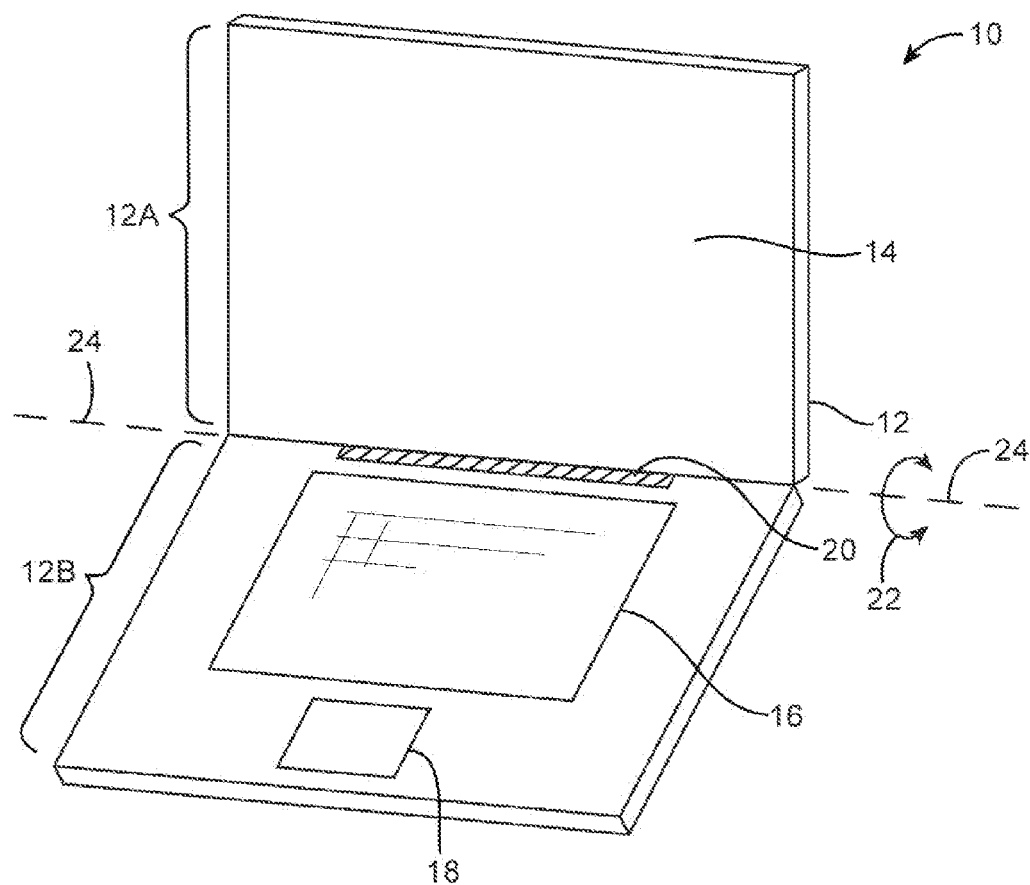
FIG. 1 is a perspective view of an illustrative electronic device such as a laptop computer with a display in accordance with an embodiment.

Illustrative electronic device 10 of FIG. 1 has the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes be referred to as a display housing or lid, may be placed in a closed position by rotating upper housing 12A towards lower housing 12B about rotational axis 24.

Figure 2:
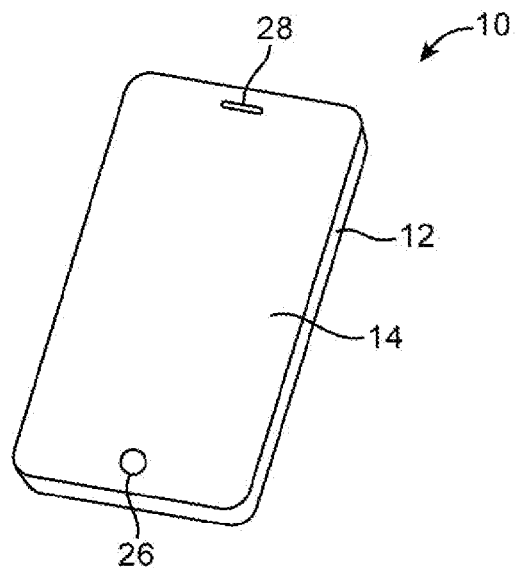
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
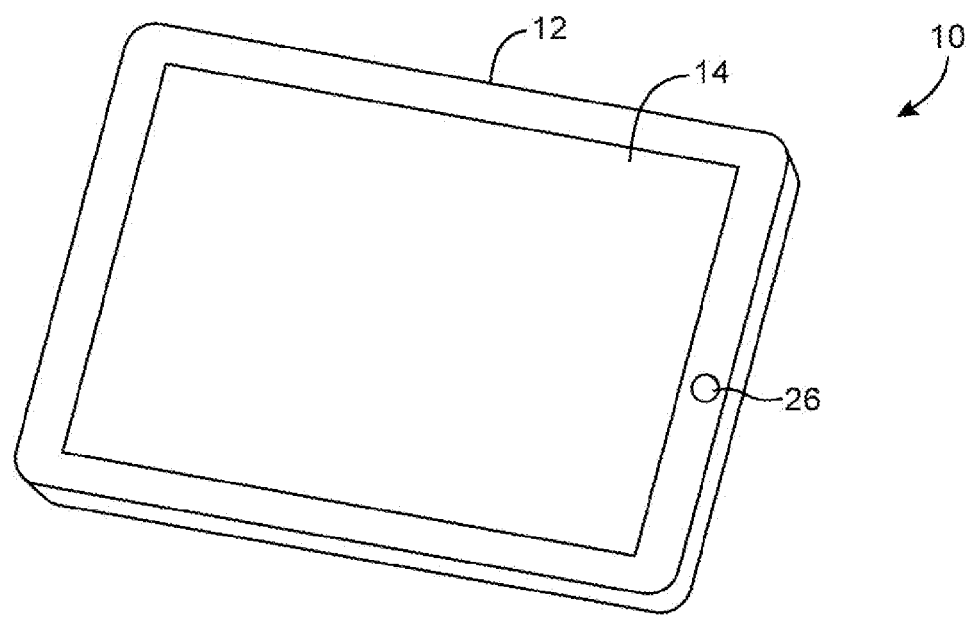
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
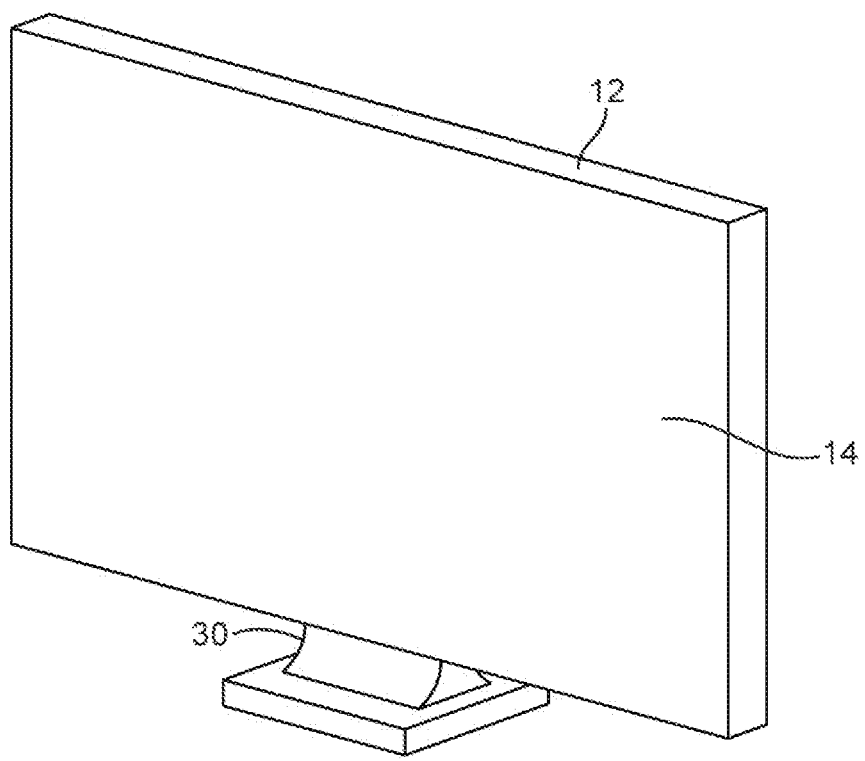
FIG. 4 is a perspective view of an illustrative electronic device such as a computer display with display structures in accordance with an embodiment.

FIG. 4 shows how electronic device 10 may be a computer display or a computer that has been integrated into a computer display. With this type of arrangement, housing 12 for device 10 may be mounted on a support structure such as stand 30 or stand 30 may be omitted (e.g., stand 30 can be omitted when mounting device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
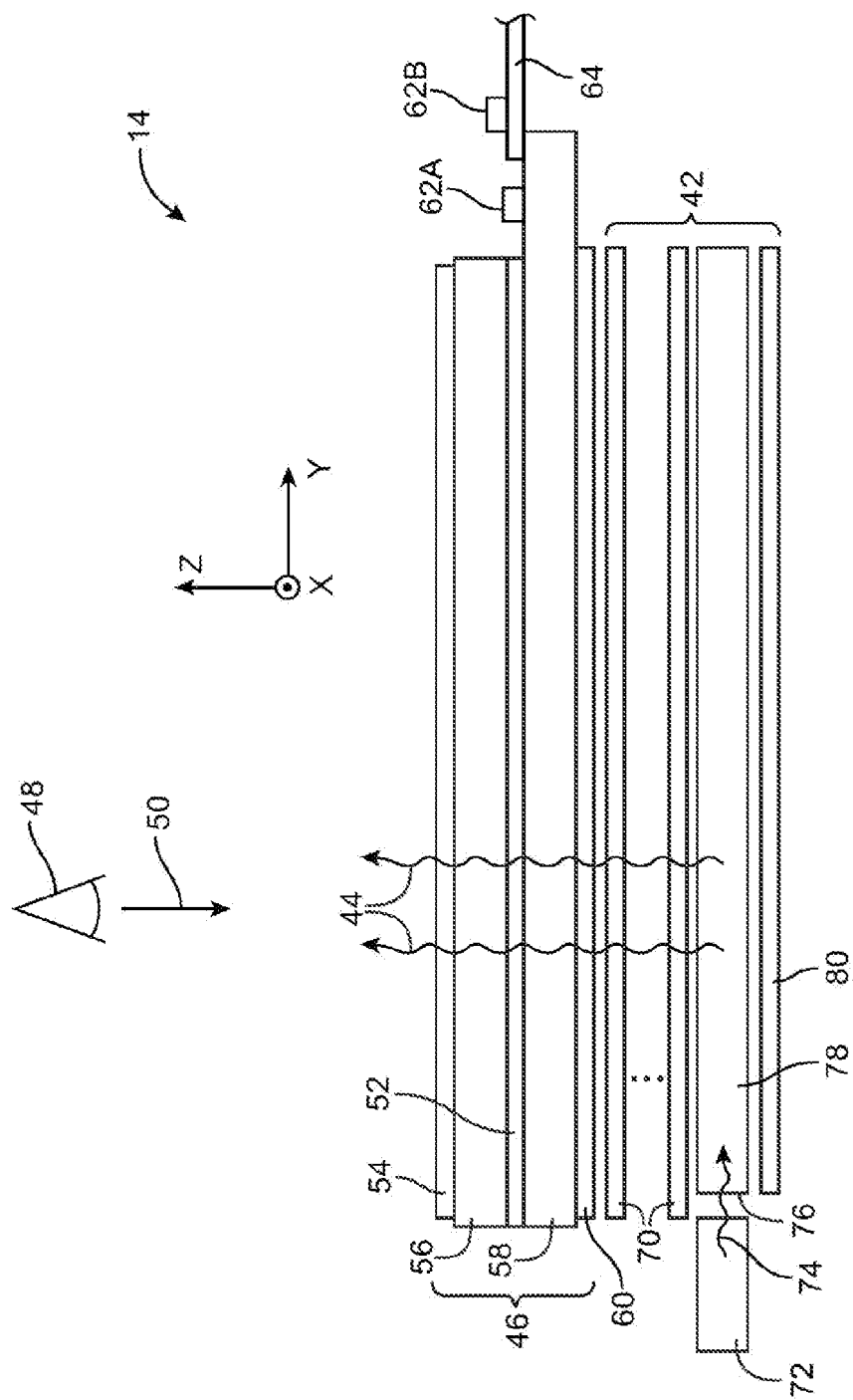
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, lower layer 58 may be a color filter layer and upper layer 56 may be a thin-film transistor layer. Another illustrative configuration involves forming color filter elements and thin-film transistor circuits with associated pixel electrodes on a common substrate. This common substrate may be the upper substrate or may be the lower substrate and may be used in conjunction with an opposing glass or plastic layer (e.g., a layer with or without any color filter elements, thin-film transistors, etc.) to contain liquid crystal layer 52. Illustrative configurations for display 14 in which layer 56 is a color filter layer and layer 58 is a thin-film transistor layer are sometimes described herein as an example.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes. If desired, light sources such as light source 72 may be located along multiple edges of light guide plate 78.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint. If desired, optical films such as these may be incorporated into other portions of display 14. For example, compensation films may be incorporated into polarizer layers, etc.

Figure 6:
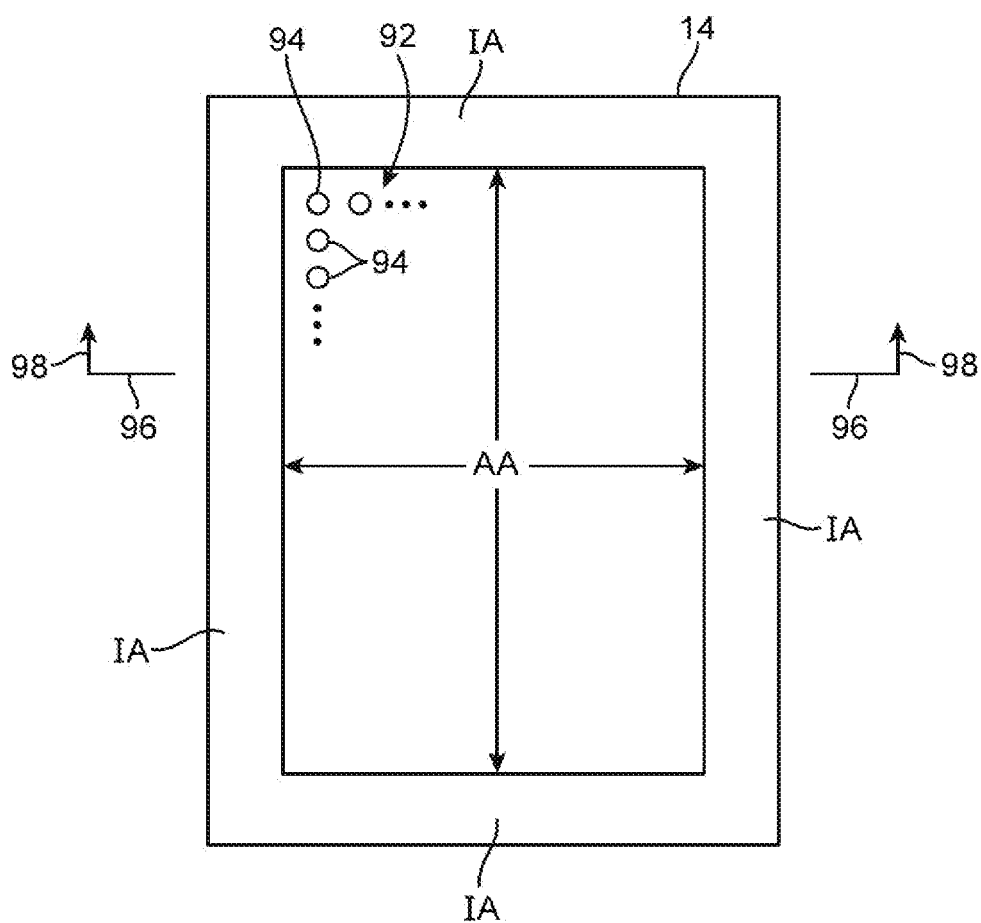
FIG. 6 is a top view of an array of pixels in a display in accordance with an embodiment.

As shown in FIG. 6, display 14 may include an active area such as rectangular active area AA that displays images for a user and may include an inactive area such as inactive border area IA that runs along one or more edges of active area AA. As an example, inactive border area IA may form a rectangular ring that surrounds active area AA, as shown in FIG. 6.

Active area AA contains pixel array 92. Pixel array 92 contains an array of pixels such as pixels 94. Pixel array 92 may be controlled using control signals produced by display driver circuitry. The display driver circuitry may include one or more integrated circuits (e.g., timing controller integrated circuits) and/or thin-film transistor circuitry (e.g., data line demultiplexing circuitry and/or gate driver circuitry on layer 58). The display driver circuitry of display 14 (e.g., the thin-film transistor circuitry such as the demultiplexer circuitry and gate driver circuitry) may be located in inactive area IA. As an example, gate driver circuits may run along the left and right edges of display 14 in inactive area IA.

During operation of device 10, control circuitry in device 10 such as memory circuits, microprocessors, and other storage and processing circuitry may provide data to the display driver circuitry. The display driver circuitry may convert the data into signals for controlling rows and columns of display pixels 94 in pixel array 92.

Pixels 94 in pixel array 92 may contain thin-film transistor circuitry (e.g., polysilicon transistor circuitry or amorphous silicon transistor circuitry) and associated electrode structures for producing electric fields across liquid crystal layer 52 in display 14. Each display pixel may have a respective thin-film transistor to control the application of electric fields to a respective pixel-sized portion of liquid crystal layer 52.

The thin-film transistor structures that are used in forming pixels 94 may be located on a thin-film transistor substrate such as a layer of glass. The thin-film transistor substrate and the structures of display pixels 94 that are formed on the surface of the thin-film transistor substrate collectively form thin-film transistor layer 58 of FIG. 5.

Figure 7:
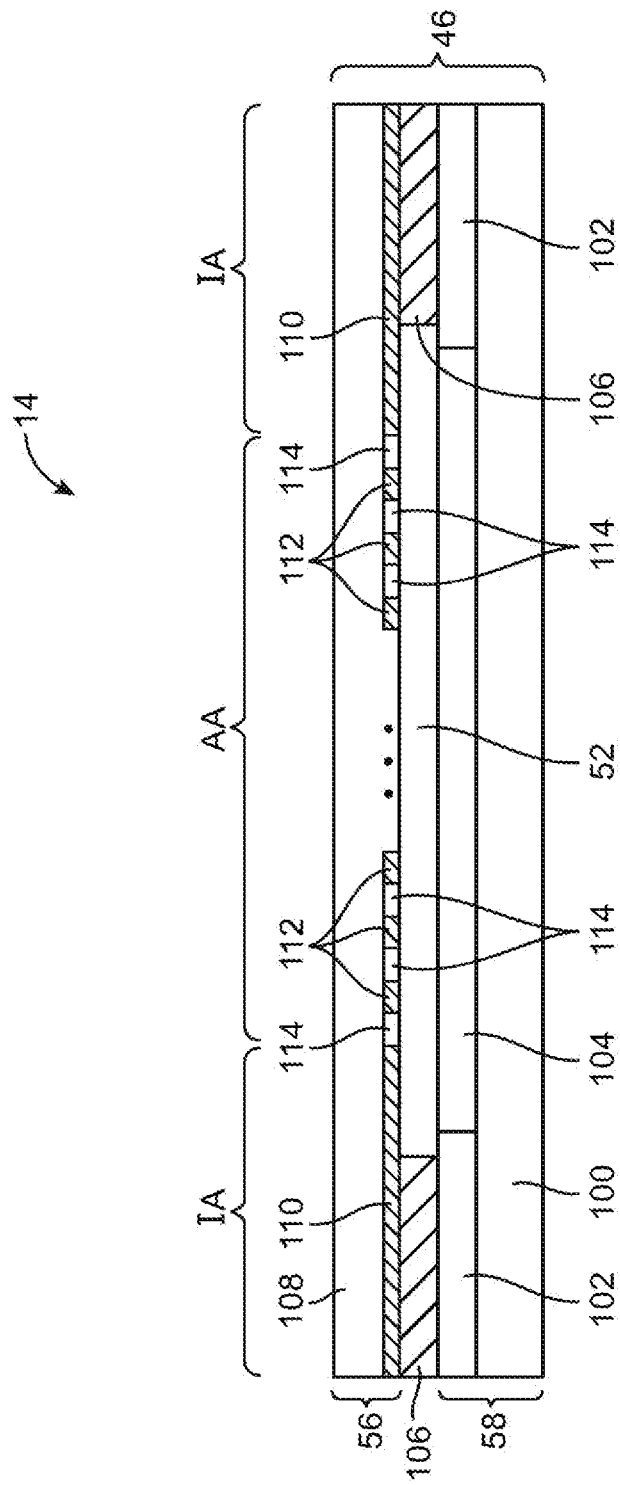
FIG. 7 is a cross-sectional side view of a portion of a display showing how the display may have a border with light-blocking structures in accordance with an embodiment.

A cross-sectional side view of display 14 of FIG. 6 taken along line 96 and viewed in direction 98 is shown in FIG. 7. As shown in FIG. 7, liquid crystal layer 52 may be interposed between color filter layer 56 and thin-film transistor layer 58. Thin-film transistor layer 58 may include a substrate such as substrate 100. Substrate 100 may be formed from a layer of glass, a plastic layer, or other substrate material. Thin-film transistor circuitry may be formed on substrate 100. For example, thin-film transistor layer 58 may have thin-film transistor circuitry 104 in active area AA. Thin-film transistor circuitry 104 includes electrodes for applying electric fields to liquid crystal layer 52 and includes thin-film transistors for controlling the application of the electric fields to crystal layer 52. In inactive area IA along the periphery of display 14, thin-film transistor layer 58 may have display driver circuitry such as thin-film transistor driver circuitry 102. Driver circuitry 102 may include gate drivers, demultiplexer circuitry, and other circuitry for controlling the pixel circuits of thin-film transistor circuitry 104 in active area AA.

A ring of adhesive such as adhesive 106 may run along each of the four peripheral edges of display 14 and may provide lateral confinement for liquid crystal layer 52. Adhesive 106 may be formed from epoxy or other adhesive materials. Adhesive ring 106 may be formed within inactive area IA and may attach the upper surface of thin-film transistor layer 58 to the opposing lower surface of color filter layer 56.

Color filter layer 56 may have a substrate such as substrate 108. Substrate 108 may be formed from a clear glass layer, a transparent plastic layer, or a layer of other transparent substrate material. The lower surface of color filter layer 56 may contain patterned opaque masking material such as patterned black ink, white ink, or ink or materials of other colors. Configurations in which the opaque masking material is based on an opaque material such as black ink are sometimes described herein as an example. This is, however, merely illustrative. Opaque masking material for display 14 may be formed from any suitable opaque material or materials (e.g., organic materials such as polymers, inorganic materials such as oxides or nitrides, metals, combinations of these materials, etc.).

In inactive area IA, opaque masking material is used in forming opaque border 110. Opaque border 110 may run along each of the four peripheral edges of a rectangular display (as an example). In active area AA, the opaque masking material is patterned to form patterned opaque masking material matrix 112 (sometimes referred to as an opaque matrix or black matrix). Black matrix 112 may form a grid-like pattern with openings for respective color filter elements 114. Color filter elements 114 and, if desired, material for opaque masking material matrix 112 and opaque masking material border 110 may be formed from photoimageable polymer. For example, red, green, and blue photoimageable polymers may be used for forming red, green, and blue color filter elements 114 for a color filter array on the lower surface of color filter layer 56 and photoimageable black polymer may be used in forming black matrix 112 and border 110. Each color filter element 114 may be located in a respective opening in opaque matrix 112 and may be aligned with a respective pixel electrode in the array of electrodes formed in thin-film transistor circuitry 104 of thin-film transistor layer 58. Black photoimageable polymer (e.g., a polymer into which a black filler material such as carbon black or other opaque material) or other opaque materials may be used in forming opaque border 110.

Figure 8:
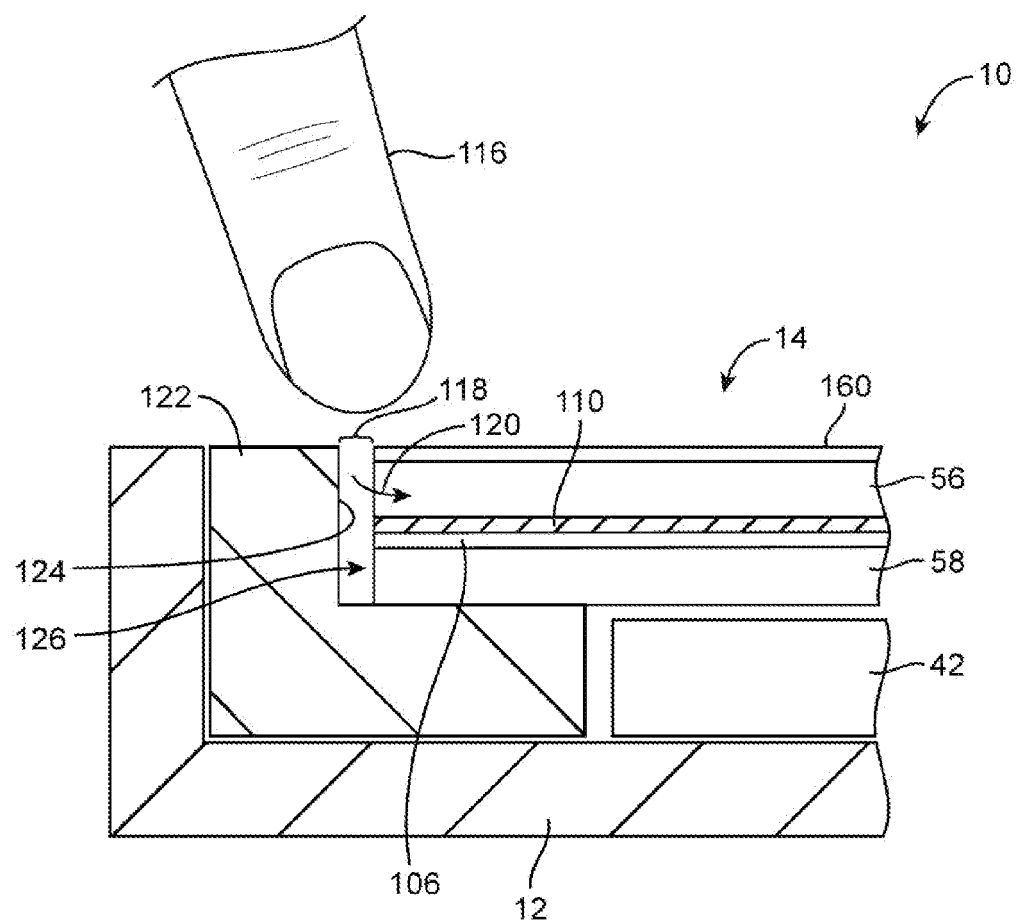
FIG. 8 is a cross-sectional side view of a portion of an illustrative electronic device showing how the edge of the display may be exposed to electrostatic discharge in accordance with an embodiment.

A cross-sectional side view of an edge portion of display 14 mounted in an illustrative housing for device 10 is shown in FIG. 8. As shown in FIG. 8, an L-shaped gasket such as gasket 122 or a gasket or mounting structure of other suitable shapes may be used in mounting display 14 within housing 12. Gasket 122 may be formed from an elastomeric material that helps prevent damage to outer vertical edge 126 of display 14. In configurations of the type shown in FIG. 8, there may be an air gap such as gap 118 between inner surface 124 of gasket 122 and outermost edge surface 126 of display 14 (i.e., the outermost edge surfaces of color filter layer 56 and thin-film transistor layer 58). Gap 118 may have a width of about 200 microns, less than 300 microns, more than 100 microns, or other suitable size. The outer surface of color filter layer 56 may be coated with a transparent conductive electrostatic discharge protection layer such as layer 160. Layer 160 may be formed form a transparent conductive material such as indium tin oxide and may be used in dissipating electrostatic charge from the surface of display 14.

In the presence of human body parts such as finger 116 or other external objects, there is a potential for static charge to be deposited on layers of display 14 such as opaque border 110 and adhesive 106 during an electrostatic discharge event. Charge can reach edge 126 of display 14 from an adjacent external object such as finger 116 and/or can migrate to edge 126 from other portions of the display such as the active area of the display via electrostatic discharge protection layer 160. If care is not taken, electrostatic charge that is deposited onto edge 126 of display 14 during an electrostatic discharge event can migrate inwardly through border 110 as shown by path 120. Opaque materials such as polymers with opaque filler material (e.g., fillers such as carbon black, etc.) may not be able to withstand the extremely high voltages (e.g., 10 kV or more) that can be produced during an electrostatic discharge event, so the presence of materials such as black photoimageable polymer in border layer 110 can create potential pathways that potentially could allow the static charge to reach the outer edges of active area AA (i.e., the liquid crystal material of layer 52 and thin-film transistor circuitry 104). This could visibly disrupt the proper operation of display 14 at the edges of active area AA.

To enhance immunity to disruption from static charge during electrostatic discharge events, opaque border 110 of display 14 may be provided with an isolation layer that serves to form an isolating border around display 14. The isolation layer may, as an example, be formed from one or more electrically isolating materials such as inorganic materials. The inorganic material layers may include materials such as silicon oxide, metal oxide (e.g., aluminum oxide), silicon nitride, oxynitrides, or other inorganic dielectric materials that are capable of withstanding elevated voltages (e.g., 10 kV or greater) of the type that are experienced during electrostatic discharge events. The inorganic dielectric layers may be deposited using plasma-enhanced chemical vapor deposition, other types of chemical vapor deposition, physical vapor deposition, or other suitable deposition techniques. If desired, the isolation layer may be formed from a polymer or other organic dielectric that is capable of withstanding elevated voltages (e.g., 10 kV or greater) of the type that are experienced during electrostatic discharge events.

To enhance the ability of the isolation layer to withstand high voltages, the isolation layer may be formed from a material that is free of opaque fillers (e.g., the isolation layer may be a layer that is free of carbon black or other black materials). As a result, the isolation layer may be transparent or may have a non-black color. To ensure that opaque border layer 110 successfully blocks light around the border of display 14 (e.g., to prevent backlight from backlight unit 42 from leaking out of display 14 along the edge of display 14 and/or to block a user's view of inactive area structures such as thin-film transistor circuitry 102), it may be desirable to ensure that one or more opaque layers of material in border 110 overlap any regions in which transparent inorganic material has been deposited.

Figure 9:
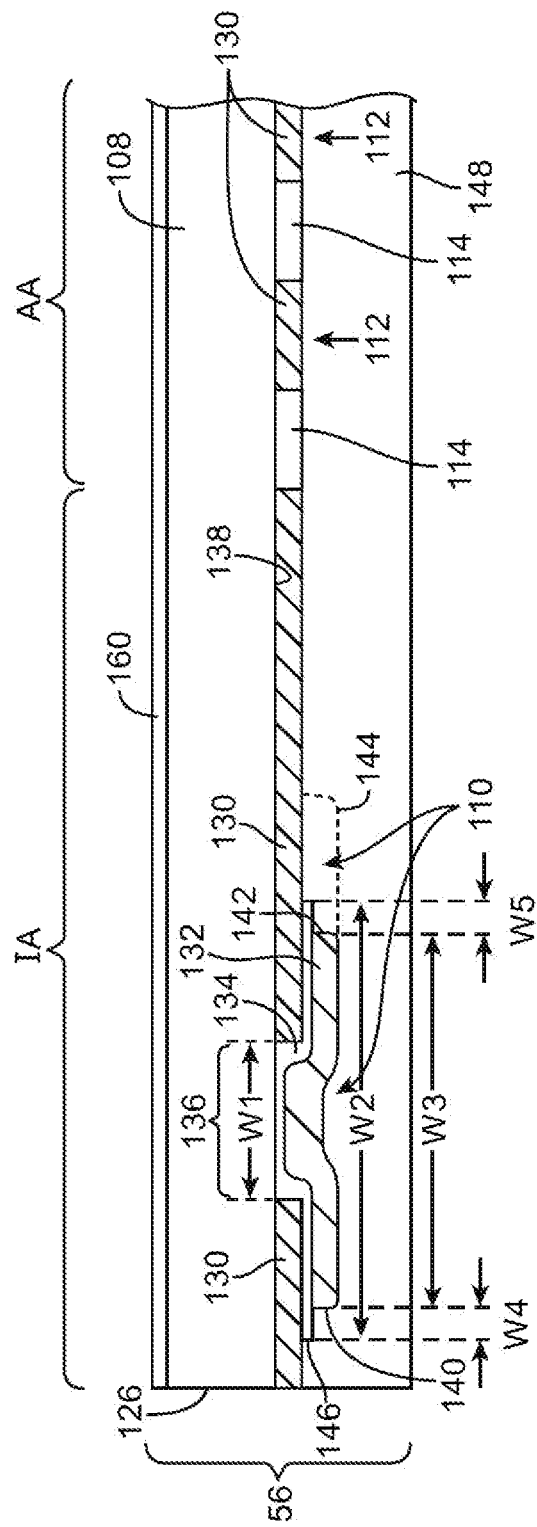
FIG. 9 is a cross-sectional side view of a portion of a display layer such as a color filter layer that has been provided with an electrostatic-discharge-resistant opaque border by filling an opening in a first opaque layer with an isolation layer and covering the isolation layer and the opening with a second opaque layer in accordance with an embodiment.

An illustrative configuration for an opaque border that is resistant to electrostatic discharge is shown in FIG. 9. In the example of FIG. 9, two opaque masking layers have been used for display 14: opaque masking layer 130 and opaque masking layer 132. Layers 130 and 132 may be formed from opaque material such as opaque photoimageable polymer (e.g., black photoimageable polymer). Other opaque materials may be used for forming layers 130 and 132 if desired.

In the FIG. 9 arrangement, layer 130 is deposited and patterned on lower (inner) surface 138 of color filter layer substrate 108. In active area AA, layer 130 is patterned to form opaque matrix 112 and has openings that are filled with color filter elements 114. In inactive area IA, layer 130 is patterned to form part of opaque border layer 110. As shown in FIG. 9, layer 130 in inactive area IA may be formed on lower surface 138 of color filter layer substrate 56 and may be patterned to have an opening such as opening 136. With one suitable arrangement, border 110 and opaque layer 130 in inactive area IA may from a rectangular ring-shaped border that surrounds all four peripheral sides of display 14. In this type of arrangement, opening 136 may form a concentric rectangular ring that also runs along each of the four peripheral edges of display 14.

Opening 136 may be filled with an isolation layer. The isolation layer may be formed from a material such as material 134 that has an enhanced ability to withstand electrostatic discharge events relative to materials such as opaque photoimageable polymer materials in inactive area IA. Material 134 may be, for example, formed from an inorganic material such as silicon nitride, silicon oxide, a metal oxide, oxynitride material, or other inorganic material that can serve as a charge isolation layer. Material 134 may form a rectangular ring that runs around the four peripheral sides of display 14. To ensure that border 110 is opaque across its entire width, second opaque masking layer 132 may be deposited over layer 134 and opening 136. Opaque masking layer 132 may have the shape of a rectangular ring that overlaps the rectangular ring shape of opening 136 and ensures that light is completely blocked by layer 130 and/or layer 132 within inactive area IA. Layer 132 need not be formed in active area AA (i.e., active area AA may be free of layer 132).

Materials 130 and 132 may be formed form black ink or other opaque material such as an opaque photoimageable polymer. Material 134 may be formed from a transparent inorganic material such as silicon nitride that is deposited using plasma-enhanced chemical vapor deposition. Material 134 has a higher resistivity (e.g., $10^{15}$-$10^{16}$ ohm-cm) than materials 130 and 132 and has a greater ability to block static charge during an electrostatic discharge event. The presence of the isolation layer formed form material 134 within opaque border layer 110 (i.e., interposed between parts of layers 130 and 132) therefore helps enhance the ability of border layer 110 to prevent disruption to the operation of the edges of active area AA of display 14 from electrostatic discharge. As a result, display 14 may be mounted in housing 12 using a relatively unprotected mounting configuration of the type shown in FIG. 8 (i.e., a structure using an L-shaped gasket such as gasket 122 or other gasket that does not overlap the front surface of color filter layer 56 and which therefore tends to expose edge 126 of display 14 to external objects such as user's finger 116).

To ensure that opaque border 110 blocks light completely, width W3 of opaque layer 132 may be larger than width W1 of opening 136. To prevent layers 130 and 132 from contacting each other in a way that forms a low-resistance path from the edge of display 14 to active area AA), width W2 of isolation layer 134 may be larger than width W3 of opaque masking layer 132 or other configurations can be used to electrically isolate at least parts of layers 130 and 132 from each other with interposed isolation layer material. As an example, width W2 may be large enough relative to width W3 to create a lateral gap W4 of about 200 microns (100-300 microns, more than 100 microns, less than 300 microns, etc.) between layer 130 and layer 132 (e.g., along the outer edge of layer 142). The value of W4 may be configured to be sufficiently large to prevent electrostatic charge from bridging gap W4 during an electrostatic discharge event.

With the illustrative configuration of FIG. 9, outermost edge 140 of layer 132 may be pulled back from edge 126 of color filter substrate 108 in color filter layer 56 (e.g., by width W4 or greater) Innermost edge 142 of layer 132 may be laterally separated from layer 130 by a width W5 or layer 130 may be extended inwardly to overlap layer 130, as shown by dotted line 144. In configurations for opaque border 110 in which layers 132 and 130 are not electrically isolated, edge 140 is preferably pulled back from edge 126 and outermost edge 146 of isolation layer 134 by a sufficient amount to prevent layers 130 and 132 from forming a path that allows charge to reach layer 132.

The underside of color filter layer 56 (e.g., layers 130, 134, and 132, color filter elements 114) may be coated with a planarization layer such as overcoat layer 148. Overcoat layer 148 may be formed form an organic layer such as a clear polymer layer.

Figure 10:
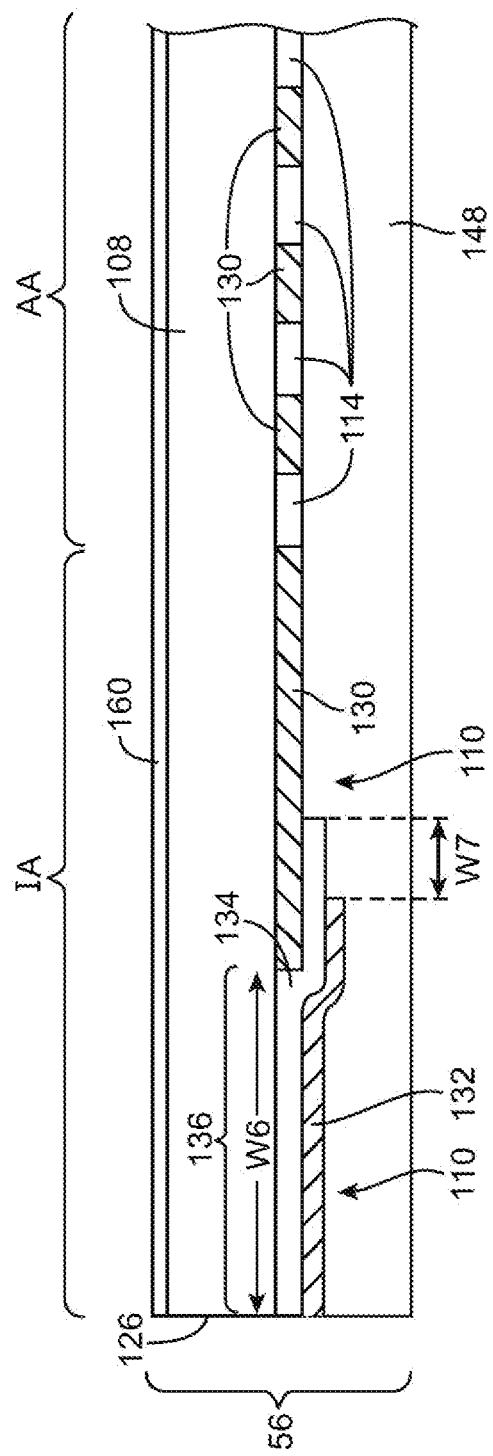
FIG. 10 is a cross-sectional side view of a portion of a display layer such as a color filter layer that has been provided with an electrostatic-discharge-resistant opaque border by interposing an isolation layer between overlapping opaque masking layers along the periphery of the display layer in accordance with an embodiment.

Another illustrative configuration for opaque border 110 is shown in FIG. 10. In the example of FIG. 10, opening 136 in opaque masking layer 130 in inactive area IA extends to edge 126 of color filter layer substrate 108. Isolation layer 134 may be wider than width W6 of opening 136, so that isolation layer 134 completely overlaps opening 136 (as an example). The width of opaque layer 132 is preferably wider than width W6 to ensure that light is blocked everywhere within inactive area IA. Width W6 of isolation layer 134 in opening 136 and width W7 separating layer 132 from layer 130 may be sufficiently large (e.g., 200 microns, 100-300 microns, more than 100 microns, less than 300 microns, etc.) to prevent charge from penetrating from edge 126 to the structures at the edge of active area AA through layers 132 and/or 130. Overcoat layer 148 may serve as a planarization layer that covers the inner surface of color filter layer 56.

Figure 11:
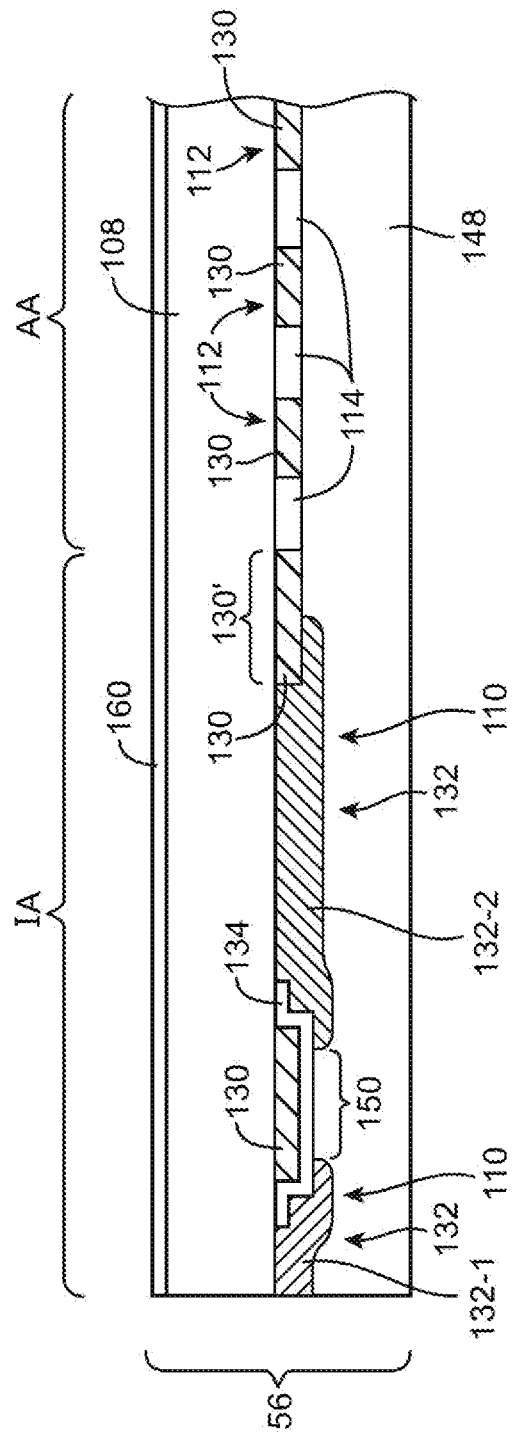
FIG. 11 is a cross-sectional side view of a portion of a display layer such as a color filter layer that has been provided with an electrostatic-discharge-resistant opaque border by interposing a peripheral ring of isolation layer material that is inset from the edge of the display layer between overlapping opaque masking layers in accordance with an embodiment.

With the illustrative configuration of FIG. 11, opaque border 110 has first opaque layer 130 and second opaque layer 132 (e.g., black ink layers). Opaque layer 130 may have portions in active area AA that are used in forming opaque matrix 112 in active area AA. In inactive area IA, opaque layer 130 may be used to form an opaque structure that overlaps opening 150 in layer 132, thereby blocking light in area IA. Inorganic isolation layer 134 may isolate layers 130 and 132 from each other. Isolation layer 134 may also isolate outer portion 132-1 of layer 132 from inner portion 132-2 of layer 132. This isolates outer (edge) portion 132-1 of layer 132 from portion 130' of layer 130 near the edge of active area AA. The isolation provided by isolation layer 134 therefore prevents electrostatic discharge from reaching active area AA through a path formed from layers 130 and 132 and prevents disruption to the operation of display 14. The width of opening 150, the width of the gap between layer 132-1 and layer 130 under opening 150, and the width of the gap between layer 130 and layer 132-2 are preferably sufficiently large (e.g., 200 microns, 100-300 microns, more than 100 microns, less than 300 microns, etc.) to prevent electrostatic charge from reaching portion 130' of layer 130 and active area AA from the outer edge of layer 56.

Figure 12:
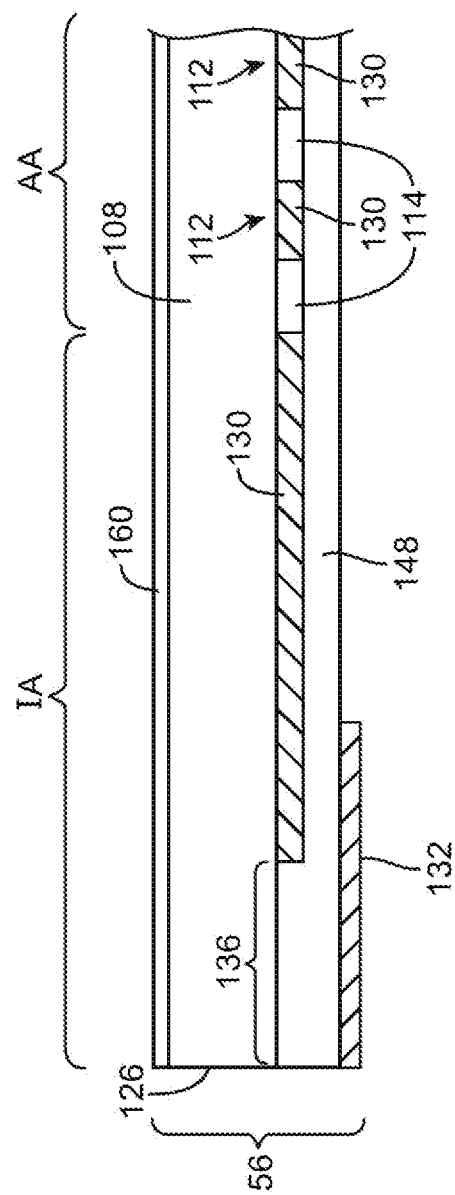
FIG. 12 is a cross-sectional side view of a portion of a display layer such as a color filter layer that has been provided with an electrostatic-discharge-resistant opaque border by interposing an isolation layer formed from a portion of a planarizing overcoat layer between respective opaque masking layers in accordance with an embodiment.

FIG. 12 shows an arrangement in which overcoat layer 148 (e.g., a clear polymer layer) serves as an isolation layer between first opaque layer 130 and second opaque layer 132. The thickness and resistivity of layer 148 are sufficient to prevent electrostatic charge that is deposited onto layer 132 at edge 126 of layer 56 from reaching layer 130 in active area AA through a path formed form layer 130 and/or layer 132. Opening 136 in layer 130 may be formed along outer edge 126 of color filter layer 56 as shown in FIG. 12 or may be inset from edge 126. Layers 130 and 132 overlap within inactive area IA. In the arrangement of FIG. 12, for example, layers 132 and 132 may overlap along the inner edge of opening 136.

As with the illustrative configurations of FIGS. 9, 10, and 11, the arrangement of FIG. 12 ensures that all of inactive area IA is overlapped by either opaque layer 130 or opaque layer 132 or both layers 130 and 132. At the same time, isolation material (i.e., material 134 in the configurations of FIGS. 9, 10, and 11 or a portion of layer 148 in the configuration of FIG. 12) that has a higher resistivity and a greater ability to withstand high voltages during electrostatic discharge events is interposed between layers 130 and 132 where they overlap to ensure that charge does not flow from the outer edge of the display to active area AA along a path formed form layer 130 and/or layer 132.

Figure 13:
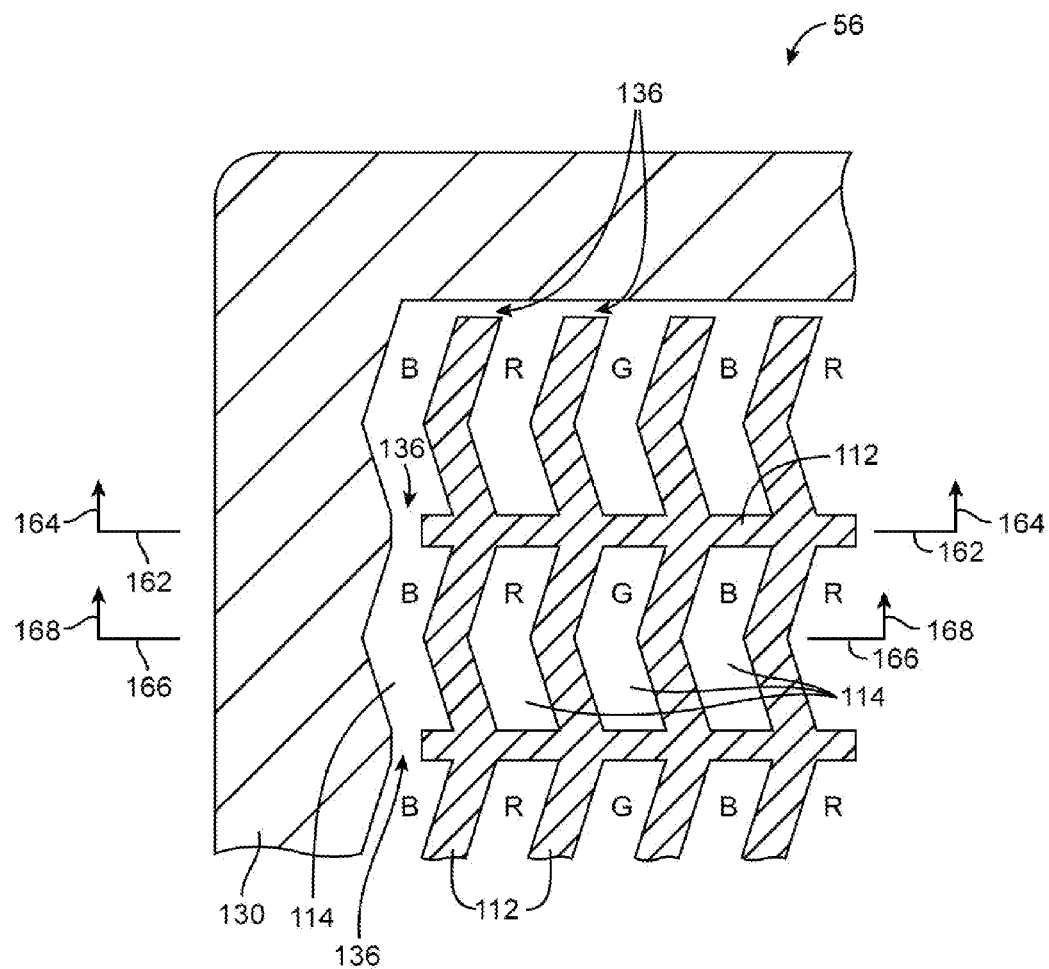
FIG. 13 is a top view of a corner portion of an illustrative color filter layer in which a black matrix region has been separated from a black border by a gap in accordance with an embodiment.

FIG. 13 is a top view of an illustrative configuration for color filter layer 56 in which opening 136 has a rectangular ring shape and is formed along the inner edge of opaque border layer 130. Color filter elements 114 may be rectangular or may have chevron shapes as shown in FIG. 13. Gap 136 may be filled with isolating material such as overcoat layer 148 and/or portions of the color filter element material used in forming blue, red, and green color filter elements 114. Blue (and red) color filter materials (e.g., blue photoimageable polymer and red photoimageable polymer) may have a higher resistivity than green color filter materials (e.g., green photoimageable polymer), so it may be desirable to form the outermost color filter elements 114 from blue (and red) color filter elements to reduce visible disruptions due to the presence of static charge during an electrostatic discharge event.

FIG. 14 is a cross-sectional side view of color filter 56 of FIG. 13 taken along line 162 of FIG. 13 and viewed in direction 164. As shown in FIG. 14, some of overcoat layer 148 may penetrate into opening 136 between opaque border layer 130 in inactive area IA and the portion of layer 130 that forms black matrix 112 in active area IA. This overcoat layer material may have a higher resistivity than the material used to form layer 130 and the portion of this layer that forms black matrix 112, so the overcoat material in opening 136 may serve as an isolation layer for the border of display 14.

FIG. 15 is a cross-sectional side view of color filter 56 of FIG. 13 taken along line 166 and viewed in direction 168. In this portion of color filter 56, blue color filter element material 114 may penetrate into opening 136 and may form part of the isolation layer.

Figure 16:
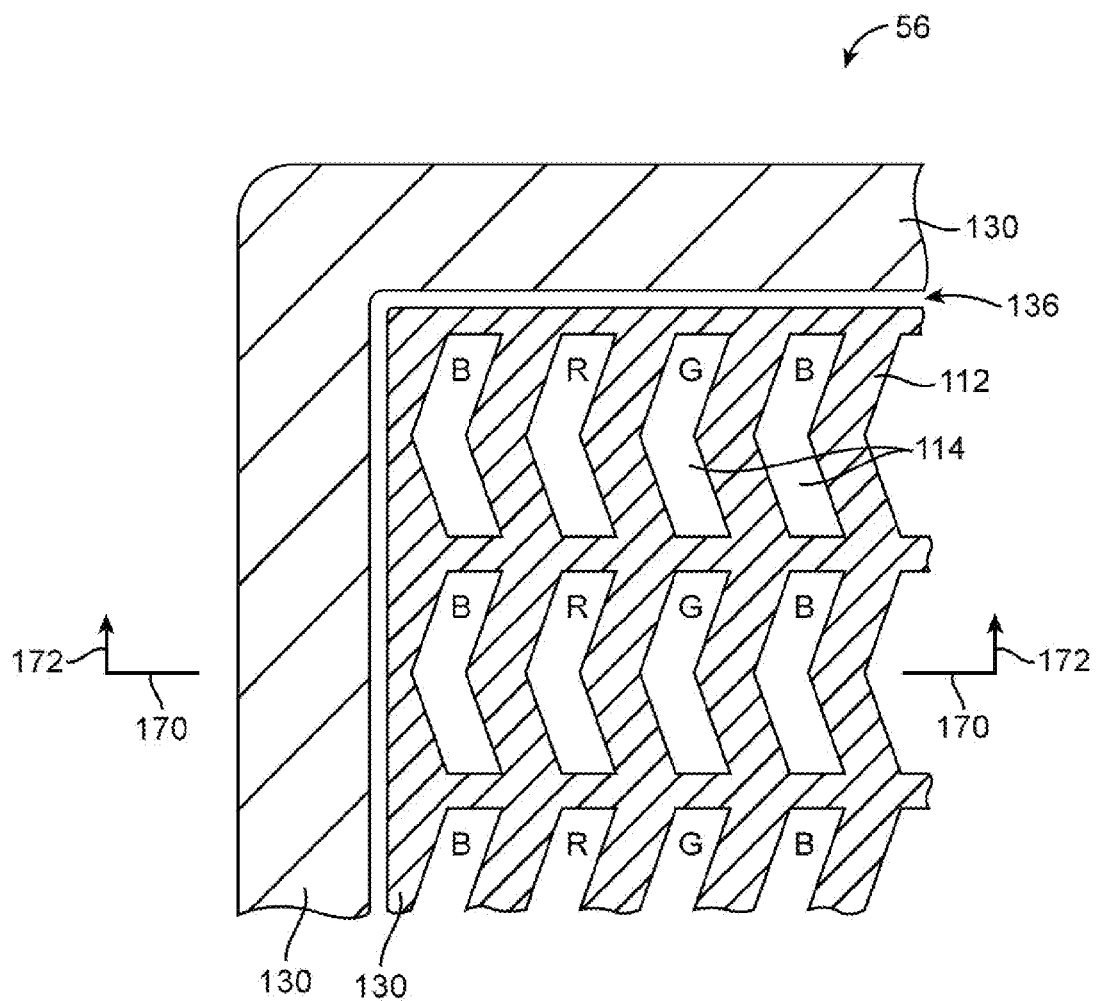
FIG. 16 is a top view of a corner portion of an illustrative color filter layer in which a peripheral gap filled with overcoat polymer has been formed within a black border in accordance with an embodiment.
Figure 17:
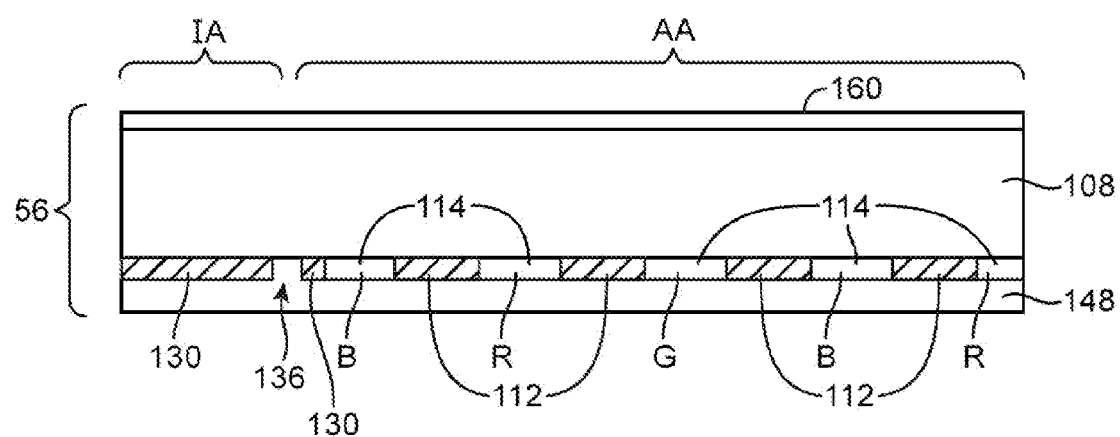
FIG. 17 is a cross-sectional side view of a portion of the color filter layer of FIG. 16 in accordance with an embodiment.

FIG. 16 is a top view of another illustrative arrangement for color filter 56. In the FIG. 16 example, opening 136 is a rectangular ring-shaped opening that lies within opaque layer 130 of inactive area IA. FIG. 17 is a cross-sectional side view of the color filter layer of FIG. 16 taken along line 170 and viewed in direction 172. A portion of opaque layer 130 in inactive area IA lies within the boundary formed by opening 136, as shown in FIG. 17. Some of overcoat layer 148 may penetrate into opening 136 and may form an isolation layer for the border of display 14 (i.e., gap 136 forms a peripheral isolating gap filled with planarizing overcoat material 148). Blue color filter elements 114 and red color filter elements 114 may be located along the outermost edge of the active area, because green color filter elements 114 are less resistive and more sensitive to electrostatic charge.

Figure 18:
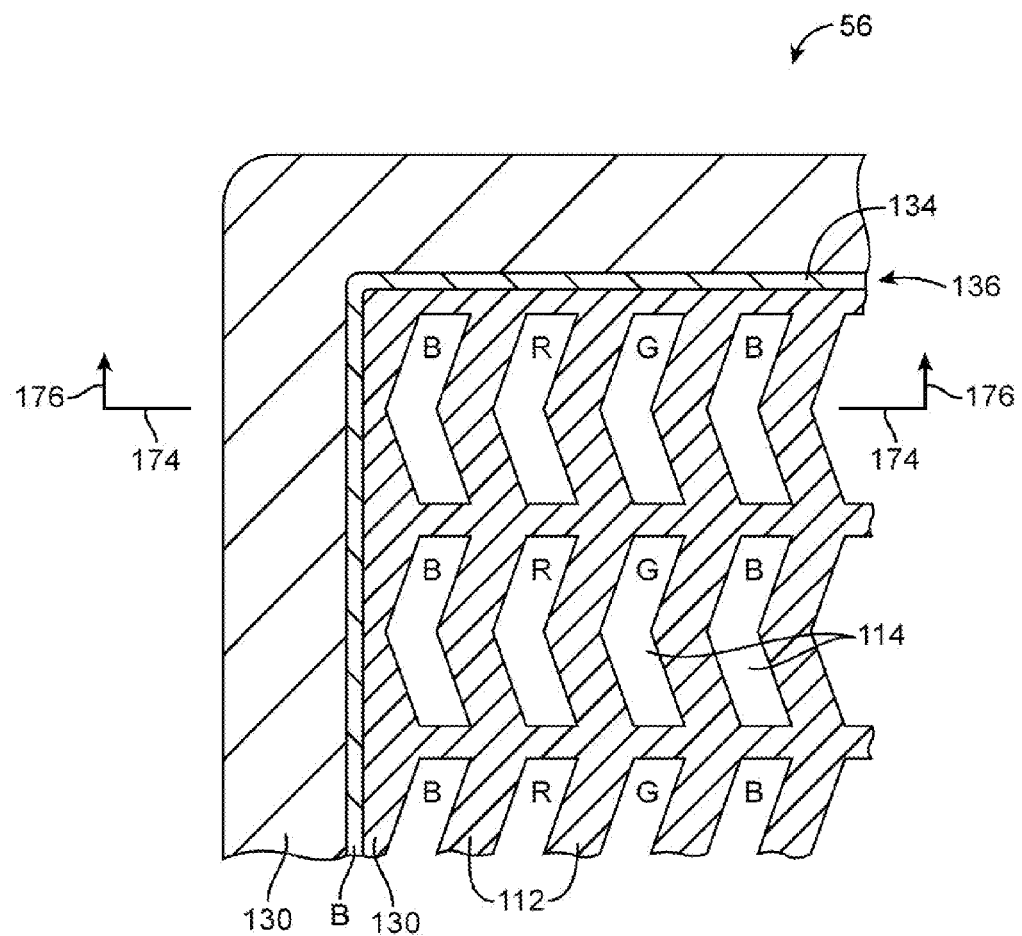
FIG. 18 is a top view of a corner portion of an illustrative color filter layer in which a peripheral gap filled with blue color filter layer material has been formed within a black border in accordance with an embodiment.
Figure 19:
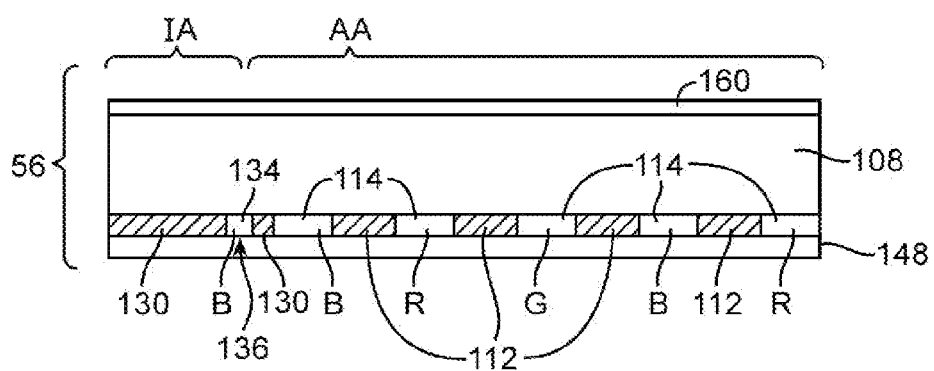
FIG. 19 is a cross-sectional side view of a portion of the color filter layer of FIG. 18 in accordance with an embodiment.

In the illustrative configuration of FIG. 18, ring-shaped opening 136 in opaque layer 130 of inactive area IA has been filled with blue color filter element material (e.g., blue photoimageable polymer). In this situation, the blue color filter element material in opening 136 serves as isolation material that helps form an isolating border for display 14 (i.e., gap 136 forms a peripheral isolating gap filled with blue photoimageable polymer). FIG. 19 is a cross-sectional side view of color filter layer 56 of FIG. 18 taken along line 174 and viewed in direction 176. As shown in FIG. 19, blue (B) color filter element material may be formed in opening 136 and therefore serves as isolation layer 134. The blue material of layer 134 may be deposited on color filter layer substrate 108 at the same time that blue (B) color filter elements 114 are being deposited and patterned within the openings of black matrix 112.

Openings such as illustrative openings 136 of FIGS. 13-19 may have any suitable width (e.g., 5-20 microns, about 10 microns, more than 5 microns, less than 20 microns, etc.). When opening 136 is narrow (e.g., 5-20 microns), the presence of opening 136 in the opaque border of display 14 may be invisible to the naked eye or at least unnoticeable to most users of device 10.

The foregoing is merely illustrative and various modifications can be made by those skilled in the art without departing from the scope and spirit of the described embodiments. The foregoing embodiments may be implemented individually or in any combination.

What is claimed is:

1. A display having an active area surrounded by an inactive area, comprising:
   a color filter layer having an inner surface and an opposing outer surface, wherein the color filter layer includes an opaque border on its inner surface in the inactive area, wherein the opaque border includes a first opaque layer, a second opaque layer, and an isolation layer interposed between at least some of the first opaque layer and some of the second opaque layer that prevents electrostatic charge from migrating to the active area through the inactive area;
   a thin-film transistor layer; and
   a layer of liquid crystal material between the color filter layer and the thin-film transistor layer, wherein the first and second opaque layers are interposed between the layer of liquid crystal material and the inner surface, and wherein the first opaque layer is interposed between the second opaque layer and the inner surface.

2. The display defined in claim 1 wherein the color filter layer and the thin-film transistor layer form an array of pixels in the active area of the display.

3. The display defined in claim 2 wherein the isolation layer comprises an inorganic layer.

4. The display defined in claim 3 wherein the isolation layer is formed in the inactive area and does not overlap the active area.

5. The display defined in claim 3 wherein the inorganic layer comprises a transparent material.

6. The display defined in claim 5 wherein the transparent material comprises a material selected from the group consisting of: an oxide and a nitride.

7. The display defined in claim 5 wherein the first and second opaque layers comprise polymer.

8. The display defined in claim 7 wherein the polymer comprises black polymer.

9. The display defined in claim 8 wherein the second opaque layer does not overlap the active area and wherein the color filter layer comprises:
a black matrix formed from a portion of the first opaque layer; and
color filter elements in openings in the black matrix.

10. The display defined in claim 9 wherein the color filter layer comprises a clear glass substrate, wherein the first and second opaque layers and the isolation layer are formed on the clear glass substrate, wherein the color filter layer further comprises a planarizing layer formed from clear polymer, wherein the planarizing layer is interposed between the clear glass substrate and the liquid crystal layer, and wherein the planarizing layer overlaps the first and second opaque layers, the isolation layer, and the color filter elements.

11. The display defined in claim 1 wherein the first opaque layer has an opening that runs along four peripheral edges of the color filter layer.

12. The display defined in claim 11 wherein the second opaque layer overlaps the opening.

13. The display defined in claim 12 wherein the isolation layer comprises a transparent inorganic material.

14. The display defined in claim 13 wherein the transparent inorganic material overlaps the opening.

15. The display defined in claim 14 wherein portions of the first opaque layer are located on opposing sides of the opening.

16. A display having an active area surrounded by an inactive area, comprising:
a color filter layer having an inner surface and an opposing outer surface, wherein the color filter layer includes an opaque layer on its inner surface, wherein a first portion of the opaque layer forms an opaque border in the inactive area, wherein a second portion of the opaque layer forms a black matrix in the active area, wherein the color filter layer has color filter elements in openings in the black matrix, wherein a peripheral isolation gap separates the first portion from the second portion and prevents electrostatic charge from migrating to the active area through the inactive area, wherein the color filter layer includes an isolation layer having a portion formed in the peripheral isolation gap, and wherein the color filter layer includes an additional opaque layer on its inner surface that overlaps the portion of the isolation layer formed in the peripheral isolation gap;
a thin-film transistor layer; and
a layer of liquid crystal material between the color filter layer and the thin-film transistor layer.

17. The display defined in claim 16 further comprising a planarizing polymer overcoat layer that covers the first and second portions of the opaque layer.

* * * * *